United States Patent
Thornburrow

(10) Patent No.: US 9,897,231 B2
(45) Date of Patent: Feb. 20, 2018

(54) NEEDLE VALVE ASSEMBLY WITH ROTATABLE CAP

(71) Applicant: Cameron International Corporation, Houston, TX (US)

(72) Inventor: Edward Thomas Thornburrow, Bradford (GB)

(73) Assignee: Cameron International Corporation, Houston, TX (US)

( * ) Notice: Subject to any disclaimer, the term of this patent is extended or adjusted under 35 U.S.C. 154(b) by 127 days.

(21) Appl. No.: 14/962,944

(22) Filed: Dec. 8, 2015

(65) Prior Publication Data

US 2017/0159845 A1    Jun. 8, 2017

(51) Int. Cl.
| | |
|---|---|
| *F16K 31/60* | (2006.01) |
| *E21B 34/02* | (2006.01) |
| *F16K 31/50* | (2006.01) |
| *F16K 1/04* | (2006.01) |

(52) U.S. Cl.
CPC .............. *F16K 31/60* (2013.01); *E21B 34/02* (2013.01); *F16K 1/04* (2013.01); *F16K 31/504* (2013.01)

(58) Field of Classification Search
CPC ........ F16K 31/60; F16K 31/504; F16K 31/50; E21B 34/02
USPC ................ 251/120–122, 214, 229, 264–278, 251/284–288, 291–293
See application file for complete search history.

(56) References Cited

U.S. PATENT DOCUMENTS

| | | | | |
|---|---|---|---|---|
| 2,018,034 A | * | 10/1935 | Roberts ................... | F16K 5/106 138/46 |
| 3,327,917 A | * | 6/1967 | Blodgett ................ | G06K 13/30 226/136 |
| 3,356,335 A | * | 12/1967 | Koch ....................... | F16K 1/302 251/214 |
| 3,445,088 A | | 5/1969 | Gallagher et al. | |
| 3,473,551 A | * | 10/1969 | Murauskas ............... | F16K 3/08 137/269 |
| 4,114,851 A | * | 9/1978 | Shivak ...................... | F16K 1/38 251/122 |
| 4,285,498 A | | 8/1981 | Nightingale | |
| 5,407,173 A | | 4/1995 | Smith | |
| 5,687,949 A | | 11/1997 | Dukas et al. | |
| 6,029,692 A | * | 2/2000 | Barber .................. | F16K 31/602 137/270 |

FOREIGN PATENT DOCUMENTS

WO    2013147638 A1    10/2013

OTHER PUBLICATIONS

Specification for Wellhead and Christmas Tree Equipment, ANSI/API Specification 6A, Jul. 2004, 19th Edition, API Publishing Services, Washington, D.C., US, pp. 189-190.

(Continued)

*Primary Examiner* — John Bastianelli
(74) *Attorney, Agent, or Firm* — Fletcher Yoder, P.C.

(57) ABSTRACT

A system includes a valve having an annular body, a cap positioned circumferentially about the annular body, and a stem positioned within an axially-extending cavity of the annular body. The stem is coupled to the cap such that rotation of the cap relative to the annular body drives the cap and the stem axially relative to the annular body to adjust the valve.

16 Claims, 5 Drawing Sheets

(56) References Cited

OTHER PUBLICATIONS

High Pressure Equipment, http://www.highpressure.com/pdfs/section/sv.pdf, accessed Dec. 7, 2015.
PCT International Search Report & Written Opinion for PCT Application No. PCT/US2016/065457 dated Feb. 28, 2017; 16 Pages.

* cited by examiner

NEEDLE VALVE ASSEMBLY WITH ROTATABLE CAP

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In certain fluid-handling systems, such as mineral extraction systems, a variety of flow control devices are used to control a flow rate, a pressure, and other parameters of fluid flow. For example, in mineral extraction systems, needle valves may be utilized to control a flow of fluid through ports (e.g., test ports or vent ports) at various locations of a wellhead. Unfortunately, certain components of typical needle valves may be subject to damage and/or wear over time.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments of the present disclosure include a valve (e.g., a needle valve) for use in fluid-handling systems, such as mineral extraction systems (e.g., hydrocarbon extraction systems). The valve may be utilized to control a flow of fluid through ports (e.g., test ports or vent ports) at various locations of a wellhead, for example. Typical valves may include a handle (e.g., a t-shaped handle) that protrudes from the wellhead. Such a configuration may subject the handle to damage (e.g., from accidental contact with other equipment and/or improper use, such as when an operator uses the handle as a foot support or stands on the handle). Additionally, typical valves may include a stem that moves between a closed position and an open position via rotation relative to a body of the valve. However, such rotation of the stem may cause scoring or wear on the stem (i.e., threads of the stem) and/or other components of the valve over time. Moreover, typical valves may not be constructed to pass a fire test. Accordingly, in certain embodiments of the present disclosure, the valve includes a protective cap (e.g., a protective cover, housing, shield, wall, or sleeve) that is relatively strong and is configured to withstand contact and/or improper use. The protective cap may also protect components underlying the cap and/or may be a rotatable knob (e.g., knob-shaped handle) configured to facilitate adjustment of the valve, as discussed in detail below. In certain embodiments, the stem is configured to move between the closed position and an open position without rotating relative to the body of the valve. Thus, the disclosed valves may enable efficient adjustment of the valve and/or may be less susceptible to damage and/or wear over time. Furthermore, the construction of the disclosed valves may enable the disclosed valves to pass a fire test.

Figure 1:
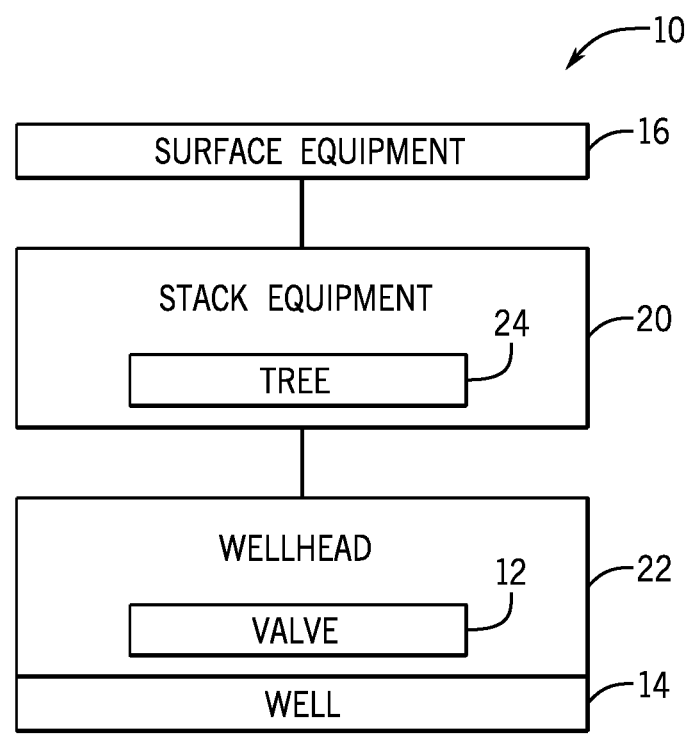
FIG. 1 is a block diagram of a mineral extraction system having a valve, in accordance with an embodiment of the present disclosure.

With the foregoing in mind, FIG. 1 is a block diagram of a mineral extraction system 10 having a valve 12 (e.g., a needle valve), in accordance with an embodiment of the present disclosure. The valve 12 is illustrated within the mineral extraction system 10 to facilitate discussion. However, as noted above, the valve 12 may be utilized as part of any suitable fluid-handling system. In the illustrated embodiment, the system 10 is configured to facilitate the extraction of a resource, such as oil or natural gas, from a well 14. As shown, the system 10 includes a variety of equipment, such as surface equipment 16 and stack equipment 20, for extracting the resource from the well 14 by way of a wellhead 22. The system 10 may be used in a variety of drilling or extraction applications.

As can be appreciated, the surface equipment 16 may include a variety of devices and systems, such as pumps, power supplies, cable and hose reels, control units, a diverter, a gimbal, a spider, and the like. The stack equipment 20 of FIG. 1 includes a production tree 24, also commonly referred to as a "Christmas tree." The tree 24 may include components that control the flow of an extracted resource out of the well 14 and upward toward the surface equipment 16 or that control the flow of injected fluids into the well 14. For instance, the tree 24 may include various conduits, a flow meter, sensors, and so forth.

In some embodiments, the valve 12 is configured to be coupled to ports (e.g., test ports or vent ports) of the wellhead 22. In such cases, the valve 12 may be moved from a closed position to an open position to enable pressure to flow through the port and/or to enable monitoring of the pressure within the port. However, it should be understood that the valve 12 may be positioned within or coupled to any suitable component of the system 10, such as the tree 24. For example, the valve 12 may be adapted to be positioned along a production bore or a lateral bore, to be used in chemical injection systems, or the like.

Figure 2:
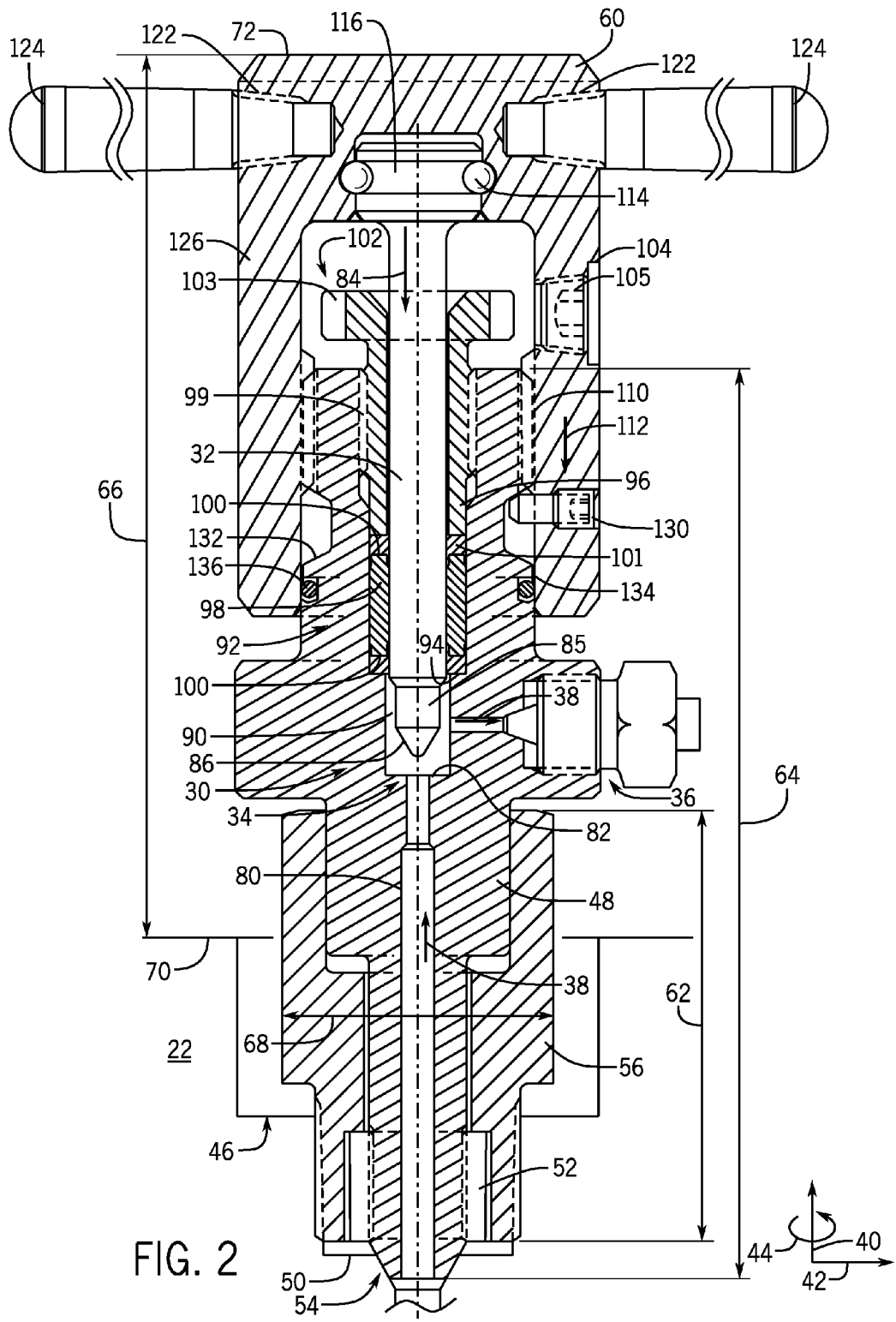
FIG. 2 is a cross-sectional side view of the valve of FIG. 1 in an open position, in accordance with an embodiment of the present disclosure.

FIG. 2 is a cross-sectional side view of the valve 12 of FIG. 1 in an open position 30, in accordance with an embodiment of the present disclosure. In the open position 30, a stem 32 of the valve 12 does not contact a seat 34 (e.g., an annular seat), thereby enabling a fluid to flow through the valve 12 and out of a vent 36 (e.g., an opening), as shown by arrows 38. To facilitate discussion, the valve 12 and its components may be described with reference to an axial axis or direction 40, a radial axis or direction 42, and a circumferential axis or direction 44.

As shown, the valve 12 may be coupled to and/or extend from a pocket 46 (e.g., opening or attachment point) of the wellhead 22. In the illustrated embodiment, a body 48 (e.g., an annular body) of the valve 12 extends from a sealing shoulder 50 (e.g., an annular sealing shoulder) of the wellhead 22. A first support gland 52 (e.g., an annular first support gland nut) circumferentially surrounds a first end 54 of the body 48, and a second support gland 56 (e.g., an annular second support gland 56 nut) circumferentially surrounds the first end 54 of the body 48 and the first support gland 52. The second support gland 56 may have any suitable configuration or geometry to support the body 48 and other components of the valve 12 (e.g., the stem 32, a cap 60, and the like). For example, as shown, the second support gland 56 extends axially from the sealing shoulder 50 toward the seat 34 and/or the vent 36. In some embodiments, an axial length 62 of the second support gland 56 is greater than about 20, 30, 40, 50, 60, or 70 percent of an axial length 64 of the body 48. In some embodiments, the axial length 62 of the second support gland 56 is greater than about 20, 30, 40, or 50 percent of an axial distance 66 between the outer surface 70 of the wellhead 22 and an end 72 of the cap 60 of the valve 12 when the valve 12 is in the open position 30. In some embodiments, the axial length 62 of the second support gland 56 is greater than about 3, 4, 5, 6, 7, 8, 9, or 10 centimeters (cm). In some embodiments, an outer diameter 68 of the second support gland 56 is greater than about 20, 30, 40, 50, 60, or 70 percent of the axial length 64 of the body 48. In some embodiments, the outer diameter 68 of the second support gland 56 is greater than about 20, 30, 40, or 50 percent of the axial distance 66 between the outer surface 70 of the wellhead 22 and the end 72 of the cap 60 of the valve 12 when the valve 12 is in the open position 30. In some embodiments, the outer diameter 68 of the second support gland 56 is greater than about 3, 4, 5, 6, 7, 8, 9, or 10 cm. As shown, the second support gland 56 extends axially from the pocket 46 and extends axially above the outer surface 70 of the wellhead 22.

The body 48 includes a passageway 80 (e.g., an axial passageway) configured to provide a flow path for fluid to flow, as shown by arrows 38, from the wellhead 22 toward the vent 36. The body 48 forms the seat 34, which in the illustrated embodiment, includes an axially-facing annular surface 82. The seat 34 may have any configuration such that contact with the stem 32 blocks the flow of fluid 38 from the passageway 80 to the vent 36, as discussed in more detail below.

The stem 32 is shown in the open position 30 and is configured to move axially as shown by arrow 84 between the open position 30 and a closed position to contact the seat 34 to block the flow of fluid 38 through the passageway 80 to the vent 36. In particular, in the illustrated embodiment, the stem 32 includes a plug portion 85 having a contacting surface 86 (e.g., tapered surface or frustoconical surface) that is configured to contact the seat 34 to block the flow of fluid through the passageway 80 to the vent 36 when the stem 32 is in the closed position, as discussed in more detail below.

The body 48 includes an axially-extending cavity 90 positioned axially above the seat 34 that is configured to receive and/or to support the stem 32. As shown, a packing assembly 92 (e.g., an annular packing assembly) circumferentially surrounds at least a portion of the stem 32. The packing assembly 92 is positioned between the body 48 and the portion of the stem 32. The packing assembly 92 may be supported by an axially-facing surface 94 (e.g., an annular axially-facing surface) of the body 48. In the illustrated embodiment, the packing assembly 92 includes a packing material 98 (e.g., an annular packing material or a flexible or compressible material), one or more metal caps 100 (e.g., annular end caps), and one or more support rings 101 (e.g., header rings). The one or more metal caps 100 may be positioned between axial ends of the packing material 98 and the one or more support rings 101. The packing assembly 92 may be formed from any suitable material. For example, in some embodiments, the packing material 98 may be formed from graphite (e.g., compressed graphite foil), the one or more metal caps 100 may be formed from steel (e.g., stainless steel), and/or the one or more support rings 101 may be formed from steel (e.g., stainless steel).

A gland 96 (e.g., an annular gland nut or annular threaded gland) is positioned axially above the packing assembly 92. The gland 96 may be threadably coupled to the body 48 via an interface 99 (e.g., threaded interface). In such embodiments, rotation of the gland 96 in the circumferential direction 44 may cause the gland 96 to move in the axial direction 40 relative to the body 48, thereby adjusting compression of the packing assembly 92. The gland 96 and/or the packing assembly 92 may form a seal configured to block the fluid from flowing from the passageway 80 axially through the valve 12 (e.g., block the fluid from flowing axially past the axially-facing surface 94 of the body 48).

In some embodiments, at least a portion of the packing assembly 92 and/or the gland 96 may be accessible for repair and/or adjustment without removing the cap 60, for example. For example, in the illustrated embodiment, the gland 96 includes a flange 102 that extends axially from the body 48 and is axially aligned with an access port 104 in the cap 60. Such a configuration may enable an operator to insert a tool (e.g., a handle 124) through the access port 104 to engage a corresponding slot 103 (e.g., recess or threaded recess) of the flange 102. While the handle 124 engages the slot 103, rotation of the cap 60 causes the gland 96 to rotate (e.g., along interface 99) and to move in the axial direction 40 relative to the body 48, thereby adjusting compression of the packing assembly 92, without removing or physically separating the cap 60 from the valve 12. For example, the gland 96 may be tightened or moved axially downward (e.g., via rotation) to compress the packing assembly 92. In the illustrated embodiment, the handle 124 may be configured to fit within the access port 104 and to adjust (e.g., to rotate) the gland 96. Thus, an operator may remove the handle 124 from a handle recess 122 in the cap 60 and insert the handle 124 into the access port 104 to adjust the gland 96. In some embodiments, the access port 104 may be threaded and the handle 124 may be inserted into the access port 104 via rotation of the handle 124. In some embodiments, a plug 105 may be positioned within the access port 104 when the access port 104 is not being used to adjust the gland 96, and the operator may remove the plug 105 to enable insertion of the handle 124 into the access port 104. Although one access port 104 is shown, any suitable number (e.g., 1, 2, 3, 4, or more) of access ports 104 may be provided at various axial and/or circumferential locations about the cap 60.

As shown, the valve 12 includes the cap 60 that circumferentially surrounds at least a portion of the body 48, the packing assembly 92, and the stem 32. For example, the cap 60 may be configured to circumferentially surround at least 50, 60, 70, 80, or 90 percent of a total axial length of the packing assembly 92. In some embodiments, the cap 60 may be configured to circumferentially surround at least 50, 60, 70, 80, or 90 percent of a total axial length of the stem 32 while the stem 32 is in the open position 30. In some embodiments, the cap 60 may have a total axial length that is at least 50, 60, 70, 80, or 90 percent of a distance between the end 72 of the cap 60 and the outer surface 70 of the wellhead 22 when the valve 12 is coupled to the wellhead 22. In the illustrated embodiment, the cap 60 is rotatably coupled to the body 48. For example, the cap 60 is rotatably coupled to the body 48 via an interface 110 (e.g., threaded interface or threaded coupling) such that rotation of the cap 60 about the body 48 in the circumferential direction 44 causes the cap 60 to move axially relative to the body 48, as shown by arrow 112.

The stem 32 may be coupled to the cap 60 such that rotation of the cap 60 causes the stem 32 to move axially, as shown by arrow 84, for example. In some embodiments, the stem 32 may be coupled to the cap 60 by a rotatable coupling that enables the cap 60 to rotate relative to the stem 32 and that enables rotation of the cap 60 to drive the stem 32 only axially relative to the body 48 (i.e., without rotating relative to the body 48). For example, the rotatable coupling may include one or more ball bearings 114 (e.g., 1, 2, 3, 4, 5, 6, 7, 8, 9, 10, 11, 12, 13, 14, or more) positioned between the cap 60 and the stem 32. As shown, the ball bearings 114 are positioned in an axial gap 116 (e.g., groove) formed in the stem 32 and protrude radially-outward from the axial gap 116 into a corresponding groove of the cap 60. When an operator rotates the cap 60 in the circumferential direction 44, the cap 60 may move circumferentially and axially along the threaded interface 110. The ball bearings 114 may enable the cap 60 to rotate relative to the stem 32, while also enabling the cap 60 to drive the stem 32 axially. In some embodiments, the rotatable coupling may include rollers, needles, low friction materials, lubricant, or any other suitable bearing.

In some embodiments, the cap 60 may be rotated by directly gripping an outer surface 126 of the cap 60 and rotating the cap 60. For example, the cap 60 may be knob-like or have a generally cylindrical shape (e.g., an outer wall of the cap 60 may be generally cylindrical or a cross-section may be generally circular) to enable an operator to grip the cap 60 and to rotate the cap 60. In some embodiments, the cap 60 may have a hexagonal or quadrilateral shape (e.g., a hexagonal or quadrilateral cross-section) or have at least two flat opposed surfaces to facilitate engagement and/or rotation by a tool (e.g., a wrench). Additionally or alternatively, the cap 60 may include the handle recess 122 that is configured to receive a tool, such as the handle 124. In the illustrated embodiment, the cap 60 includes two handle recesses 122 positioned on opposite sides (e.g., at 180 degrees from one another) of the cap 60, and each handle recess 122 is configured to receive a respective handle 124. Although two handle recesses 122 and two handles 124 are shown, it should be understood that any suitable number (e.g., 1, 2, 3, 4, or more) of handle recesses 122 and/or handles 124 may be provided with any suitable spacing (e.g., positioned at discrete locations with even or uneven spacing about the circumference of the cap 60). In some cases, it may be desirable to utilize the handle 124, or other suitable tool, to rotate the cap 60. In some embodiments, it may be desirable for the handle 124 to be removable such that the handle 124 may be inserted into the handle recess 122 by an operator and may protrude from the cap 60 only during adjustment of the valve 12, for example. As discussed above, in some embodiments, the handle 124 may be removed from the handle recess 122 and inserted into the access port 104 to adjust the gland 96. Additionally or alternatively, the handle 124 may be retractable (e.g., configured to retract into a recess and extend out from the recess to enable an operator to grip the handle 124). In some embodiments, the handle 124 may be permanently fixed to or integrally formed with the cap 60.

In the illustrated embodiment, a stop pin 130 is provided to limit axial movement of the cap 60 relative to the body 48. The stop pin 130 may extend radially inward from the cap 60 into a corresponding recess 132 formed in an outer surface 134 of the body 48. As shown, the stop pin 130 is coupled to the cap 60. It should be understood that the stop pin 130 and the corresponding recess 132 may have any suitable form for blocking or limiting axial movement of the cap 60 relative to the body 48. For example, in some embodiments, the stop pin 130 may be a separate component coupled to the cap 60. In other embodiments, the stop pin 130 may include a protrusion or extension integrally formed from the cap 60. In some embodiments, the stop pin 130 may extend radially outward from the body 48 into a corresponding recess formed in the cap 60. In some embodiments, the stop pin 130 may contact a portion of the recess 132 when the valve 12 is in the open position 30 and/or a closed position to limit axial movement of the cap 60 relative to the body 48. In the illustrated embodiment, a seal 136 is provided between the body 48 and the cap 60 to block debris or other materials from reaching the interface between the body 48 and the cap 60. Additionally, the cap 60, the stem 32, and other components of the valve 12 may be formed from any suitable materials. For example, in some embodiments, the cap 60 may be formed from stainless steel and the stem 32 may be formed from a nickel alloy. The configuration of certain features of the valve 12, such as the packing assembly 92, the gland 96, and/or the cap 60, may enable the valve to pass a fire test.

Figure 3:
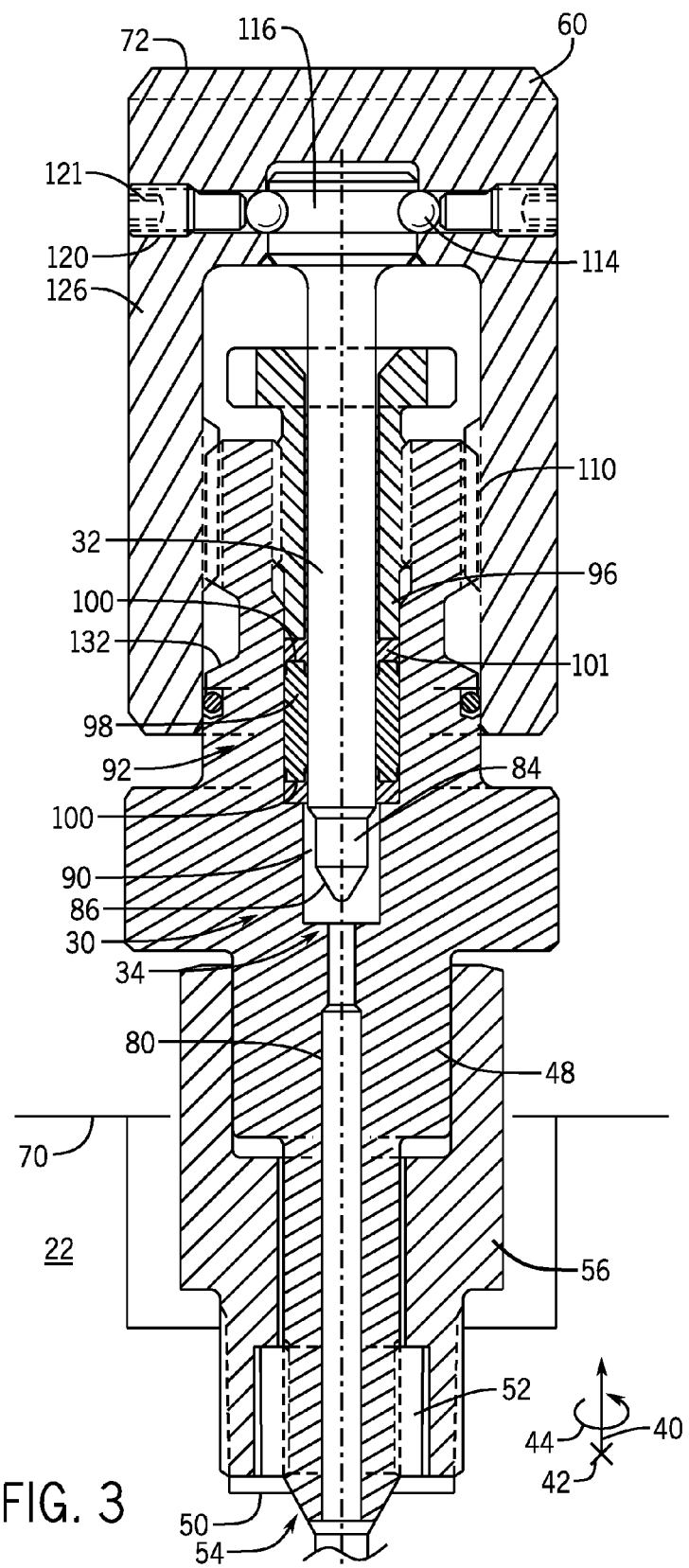
FIG. 3 is a cross-sectional side view of the valve of FIG. 1 showing ball bearing ports, in accordance with an embodiment of the present disclosure.

FIG. 3 is a cross-sectional side view of the valve 12 showing ball bearing ports 120, in accordance with an embodiment of the present disclosure. The valve 12 shown in FIG. 3 is rotated 90 degrees relative to the valve 12 shown in FIG. 2. While FIGS. 2 and 3 illustrate the ball bearing ports 120 and the handle recesses 122 positioned at 90 degrees relative to one another, it should be understood that the ball bearing ports 120 may have any suitable spacing relative to the handle recesses 122. As shown, the ball bearing ports 120 are provided to facilitate access to install, inspect, repair, and/or replace the ball bearings 114 without removing or physically separating the cap 60 from the valve 12. For example, in the illustrated embodiment, two ball bearing ports 120 are positioned on opposite sides of the cap 60 (e.g., at 180 degrees). In such a configuration, the ball bearings 114 may be removed by providing (e.g., flowing or injecting) a fluid (e.g., air) into a first ball bearing port 120 to drive the ball bearings 114 out of a second ball bearing port 120 on the opposite side of the cap 60. The ball bearings 114 may be supported and/or contained within the axial gap 116 by plugs 121 positioned within the ports 120. As noted above, in some embodiments, the rotatable coupling may include rollers, needles, low friction materials, lubricant, or any other suitable bearing. In such cases, one or more ports 120 may be adapted to facilitate access to install, inspect, repair, and/or replace the rotatable coupling without removing or physically separating the cap 60 from the valve 12.

Figure 4:
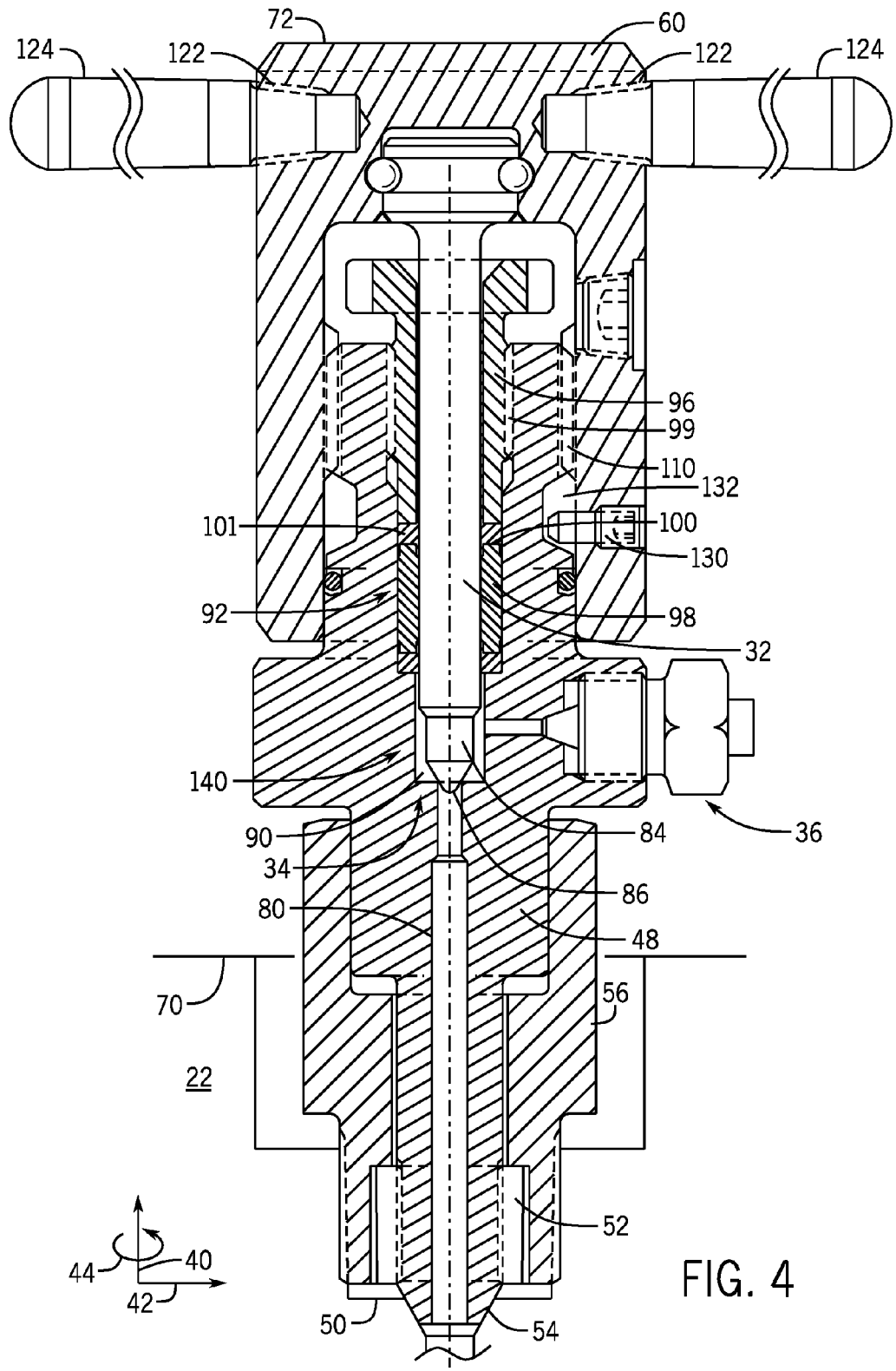
FIG. 4 is a cross-sectional side view of the valve of FIG. 1 in a closed position, in accordance with an embodiment of the present disclosure.

FIG. 4 is a cross-sectional side view of the valve 12 of FIG. 1 in a closed position 140, in accordance with an embodiment of the present disclosure. In the closed position 140, the contacting surface 86 of the stem 32 contacts the seat 34, thereby blocking the flow of fluid from the passageway 80 to the vent 36. As discussed above, rotation of the cap 60 causes the stem 32 to move axially from the open position 30 to the closed position 140. In particular, rotation of the cap 60 causes the cap 60 to move circumferentially and axially via the threaded interface 110. Because the cap 60 is coupled to the stem 32 via the ball bearings 114, rotation of the cap 60 enables the cap 60 to drive the stem 32 only axially without causing the stem 32 to rotate relative to the body 48. Such a configuration may desirably reduce wear on the stem 32, the body 48, and/or other components of the valve 12.

Figure 5:
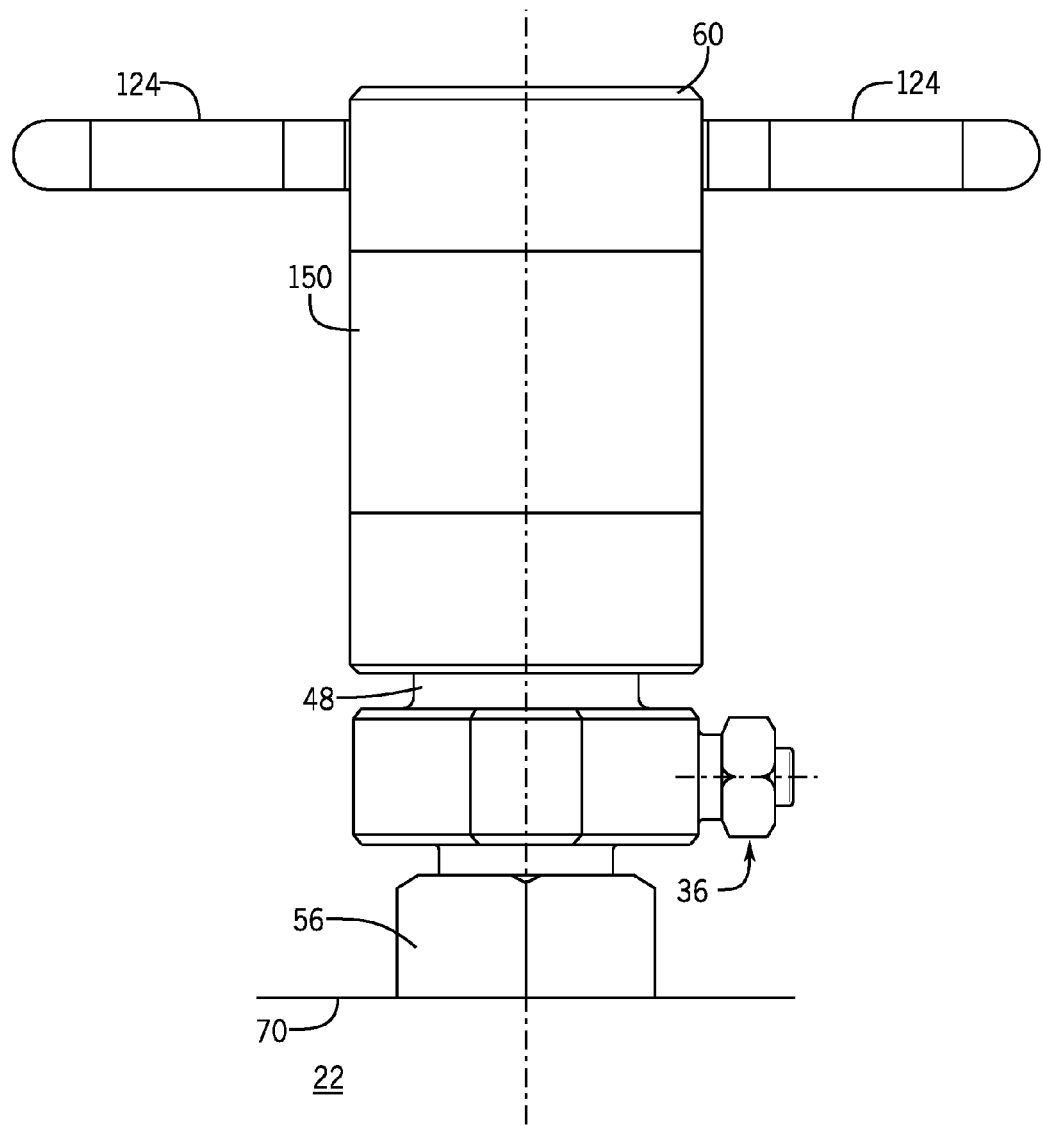
FIG. 5 is a side view of the valve of FIG. 1, in accordance with an embodiment of the present disclosure.

FIG. 5 is a side view of an embodiment of the valve 12 of FIG. 1. As shown, the valve 12 extends from the wellhead 22. In particular, the second support gland 56 extends from the outer surface 70 of the wellhead 22 and supports the body 48 of the valve 12. The port 36 extends radially outward from the body 48 to enable fluid to flow from the wellhead 22. The cap 60 is positioned about at least a portion of the body 48 and/or other components of the valve 12, such as the stem 32 and the packing assembly 92, discussed above with respect to FIGS. 2 and 3. The cap 60 may protect such components from impact or damage and/or may form a knob-like handle to facilitate efficient adjustment of the valve 12. In the illustrated embodiment, the cap 60 has a generally cylindrical shape and includes a textured outer surface 150 to enable an operator to grip the cap 60. As discussed above, rotation of the cap 60 in the circumferential direction 44 (i.e., about the axial axis 40) may cause the stem 32 of the valve 12 to move axially between the open position 30 and the closed position 140. As shown, in some embodiments, the handle 124 may extend radially outward from the cap 60 to facilitate rotation of the cap 60, adjustment of the valve 12, and/or adjustment of the gland 96 via insertion into the access port 104.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a valve, comprising:
an annular body;
a cap positioned circumferentially about the annular body;
a stem positioned within an axially-extending cavity of the annular body and coupled to the cap such that rotation of the cap relative to the annular body drives the cap and the stem axially relative to the annular body to adjust the valve, wherein the stem is coupled to the cap via one or more bearings; and
a port extending through the cap and configured to enable removal of the one or more bearings without physically separating the cap from the annular body.

2. The system of claim 1, wherein rotation of the cap relative to the annular body causes the stem to move along an axial axis of the valve without rotating about the axial axis.

3. The system of claim 1, comprising an annular packing assembly positioned between the annular body and the stem, wherein the annular packing assembly comprises a packing material and a metal cap positioned at an axial end of the packing material.

4. The system of claim 3, comprising a gland positioned between the annular body and the stem and configured to compress the annular packing assembly.

5. The system of claim 4, comprising another port extending through the cap and configured to enable access to the gland without physically separating the cap from the annular body.

6. The system of claim 1, comprising a stop pin extending radially inward from the cap and a corresponding recess formed in an outer wall of the annular body, wherein the stop pin and the corresponding recess are configured to limit axial movement of the cap relative to the annular body.

7. The system of claim 1, comprising a handle recess formed in the cap, wherein the handle recess is configured to removably receive a handle to facilitate rotation of the cap relative to the annular body.

8. The system of claim 1, comprising a support gland positioned circumferentially about a portion of the annular body and configured to be positioned between the stem and a sealing shoulder of a wellhead along an axial axis of the valve when the valve is coupled to the wellhead, wherein the support gland comprises a first axial length that is at least 25 percent of a second axial length of the annular body.

9. A valve, comprising:
an annular body;
a stem positioned within the annular body;
a cap positioned circumferentially about the annular body, wherein the cap is threadably coupled to an outer wall of the annular body via a threaded coupling and is rotatably coupled to the stem via a rotatable coupling, and wherein rotation of the cap about an axial axis of the valve causes the cap and the stem to move along the axial axis relative to the annular body;
an annular packing assembly positioned between the annular body and the stem, wherein the annular packing assembly comprises a packing material; and
a gland positioned between the annular body and the stem and configured to compress the annular packing assembly, wherein a port extends through the cap to enable access to the gland without physically separating the cap from the annular body.

10. The valve of claim 9, wherein rotation of the cap drives the stem to move along the axial axis without rotating about the axial axis.

11. The valve of claim 9, wherein the rotatable coupling comprises one or more ball bearings.

12. The valve of claim 9, comprising a handle recess formed in the cap, wherein the handle recess is configured to removably receive a handle to facilitate rotation of the cap about the axial axis.

13. A valve, comprising:
a cap configured to be threadably coupled to an outer wall of an annular body via a threaded interface;
a stem configured to be positioned within the annular body, wherein a first end portion of the stem is rotatably coupled to the cap via one or more bearings, and wherein rotation of the cap about an axial axis of the valve causes the stem to move along the axial axis between an open position which enables a fluid to flow between a second end portion of the stem and a seat of the valve and a closed position in which the second end portion of the stem contacts the seat and blocks the flow of the fluid between the second end portion of the stem and the seat of the valve; and a port extending through the cap and configured to enable removal of the one or more bearings without physically separating the cap from the annular body.

14. The valve of claim 13, wherein the stem is configured to move between the open position and the closed position without rotating about the axial axis of the valve.

15. The valve of claim 13, wherein a gland and a packing material are positioned between the annular body and the stem.

16. The valve of claim 13, wherein the cap has a generally cylindrical shape.

\* \* \* \* \*